United States Patent [19]

Kiederle et al.

[11] Patent Number: 5,263,813
[45] Date of Patent: Nov. 23, 1993

[54] APPARATUS HAVING A GRIPPING MECHANISM FOR THE STACKING AND UNSTACKING OF CONTAINERS

[75] Inventors: Richard Kiederle, Stadtbergen; Eugen Schmid, Neusäß; Leo Federspiel, Diedorf, all of Fed. Rep. of Germany

[73] Assignee: Steinle Maschinenfabrik GmbH, Fed. Rep. of Germany

[21] Appl. No.: 613,365

[22] Filed: Nov. 15, 1990

[30] Foreign Application Priority Data

Dec. 11, 1989 [DE] Fed. Rep. of Germany ....... 3940865

[51] Int. Cl.⁵ .............................................. B65G 59/02
[52] U.S. Cl. ............................. 414/792.9; 294/67.31; 294/81.51; 294/87.1; 414/753; 414/908
[58] Field of Search ............... 294/67.31, 81.51, 81.61, 294/87.1; 414/792.9, 796.9, 753, 729, 736, 739, 744.8, 751, 908, 910

[56] References Cited

U.S. PATENT DOCUMENTS

| | | | |
|---|---|---|---|
| 3,517,831 | 6/1970 | Hahn | 414/792.9 X |
| 5,054,836 | 10/1991 | Schulz | 414/739 X |

FOREIGN PATENT DOCUMENTS

| | | | |
|---|---|---|---|
| 366943 | 5/1990 | European Pat. Off. | 414/792.9 |
| 145257 | 12/1980 | German Democratic Rep. | 414/729 |
| 140417 | 6/1986 | Japan | 414/792.9 |
| 580114 | 11/1977 | U.S.S.R. | 414/792.9 |
| 1342686 | 10/1987 | U.S.S.R. | 414/796.9 |

*Primary Examiner*—Michael S. Huppert
*Assistant Examiner*—Janice Krizek
*Attorney, Agent, or Firm*—Harrison & Egbert

[57] ABSTRACT

In a device for stacking and unstacking containers provided with grasping holes and more particularly for the loading and unloading of palettes with such containers, such as bottle crates and the like, comprising a gripper member having grippers adapted to be brought in and out of engagement with the holes to pick up and deposit such container and which is mounted on a gripping carriage able to be driven on a turnover area for such crates between a pickup site and a depositing site of same, there is the improvement that the grippers for picking up and depositing the containers are arranged, and adapted to be vertically moved, to pickup and deposit the containers while simultaneously performing a pivoting motion in relation to the gripping member which is stationarily arranged in relation to the gripper carriage. This design has the advantage that operation of the grippers on the fly is possible and accordingly the handling rate of the arrangement is enhanced.

10 Claims, 3 Drawing Sheets

APPARATUS HAVING A GRIPPING MECHANISM FOR THE STACKING AND UNSTACKING OF CONTAINERS

BACKGROUND OF THE INVENTION

The invention relates to a device for stacking and unstacking containers provided with grasping holes and more particularly for the loading and unloading of palettes with such containers, such as bottle crates and the like, comprising a gripper member having grippers adapted to be brought in and out of engagement with the said holes to pick up and deposit such container and which is mounted on a gripping carriage able to be driven on a turnover area for such crates between a pickup and a depositing site of same.

In order to bring the grippers, which are generally in the form of hooks, into and out of engagement with the holes of the containers it is necessary to pivot the grippers. In order to lift and lower the containers the grippers which have been brought into engagement with them have to perform a vertical motion. In the known arrangements this is performed by the gripping member, which for this purpose performs a vertical motion in relation to the gripping carriage. The grippers mounted on the gripping member are therefore only designed for a purely pivoting motion in relation to the gripping member. Owing to the separate performance of the lifting motion and of the pivoting motion there is not only a complex design but furthermore, as experience has shown, jerky operation and, more significantly, much idle time, which leads to a low handling rate.

SHORT SUMMARY OF THE PRESENT INVENTION

Accordingly one object of the present invention is to improve upon known handling systems of this type and to provide a device of the initially mentioned type based on the use of simple and low price means.

A still further aim of the invention is to provide such a device which leads to a higher handling rate.

In order to achieve these or other objects appearing from the present specification, claims and drawings, in the present invention the grippers for picking up and depositing the containers are arranged and adapted to be lifted and lowered to pickup and deposit the containers while simultaneously performing a pivoting motion in relation to the gripping member which is stationarily arranged in relation to the gripper carriage mounting same.

The combination in accordance with the invention of the vertical and pivoting motion means that the grippers in this case practically function as flying grippers performing the action of container release and container pickup while moving bodily, that is to say without having to be specially halted in order to perform the gripping or releasing function. In other words, the functions of release and pickup take place "on the fly". There is thus the advantage of a reduction of the time needed for change over from one type of motion to another and thus smoother coordination of the different movements, this generally leading to the decrease in the amount of idle time and an increase in the handling rate. There is simultaneously a comparatively simple structure, since the desired motion of the grippers with the vertical and slewing components may be effected by one and the same drive means and the second drive means, which has so far been necessary, is no longer required. In this connection there is furthermore comparatively smooth running.

The above advantages may be particularly effectively realized if the grippers are arranged to perform a horizontal reciprocating motion modulated with a curvilinear vertical motion, the engaging claws of the grippers sweeping along an upwardly open curve of motion, which has a first vertical flank and a second flank which is curved and/or inclined in relation to the first flank.

A further particularly preferred feature of the invention is such that the vertical speed of the gripper claws decreases towards the arcuate reversal point between the two said flanks. Then the engaging and the releasing motion takes place comparatively slowly, this leading to highly reliable operation. However a complete standstill of the grippers is avoided.

As part of a further advantageous feature of the present invention in order to mount a row of grippers of the grippers arranged in a row, a respective pivoting brace may be provided, which adjacent to one side and more particularly adjacent to both sides, is connected by two pivoting levers, of which one is driven, with the frame of the gripper member. These measures lead to an articulated quadrilateral linkage, in the case of which the desired form of the curve may be obtained by the simple selection of the setting and length of the pivoting levers. Furthermore, there is a comparatively simple structure with a low wear rate and a particularly straightforward combination of movements.

In this respect it is possible for the driven rocker lever to be connected with a pinion which is in engagement with a reciprocating drive element, preferably in the form of a rack. This means that the motion of the system is particularly precise.

A further possible feature of the invention is that the gripper carriage is stationary in the vertical direction and the turnover or handling site includes on the one hand a piling station which is stationary in the vertical direction and on the other hand has a vertically moving stage which is able to be raised to the level of the piling station and to be lowered therefrom. Then in this respect the function of the grippers operating on the fly offers special advantages, since the increase and the decrease in the height of the stack on the vertically moving stage will be compensated for by same and the gripper carriage may thus be vertically stationary. Thus it is possible to have an overlap of the movements and this means that there is no need for the position of the gripper carriage to be corrected, a further factor leading to an increase in the possible handling rate.

Further features and advantages of the invention will be gathered from the ensuing detailed description of one embodiment thereof referring to the drawings.

LIST OF THE SEVERAL VIEWS OF THE DRAWINGS

DETAILED DESCRIPTION OF WORKING THE EMBODIMENT OF THE INVENTION

Figure 1:
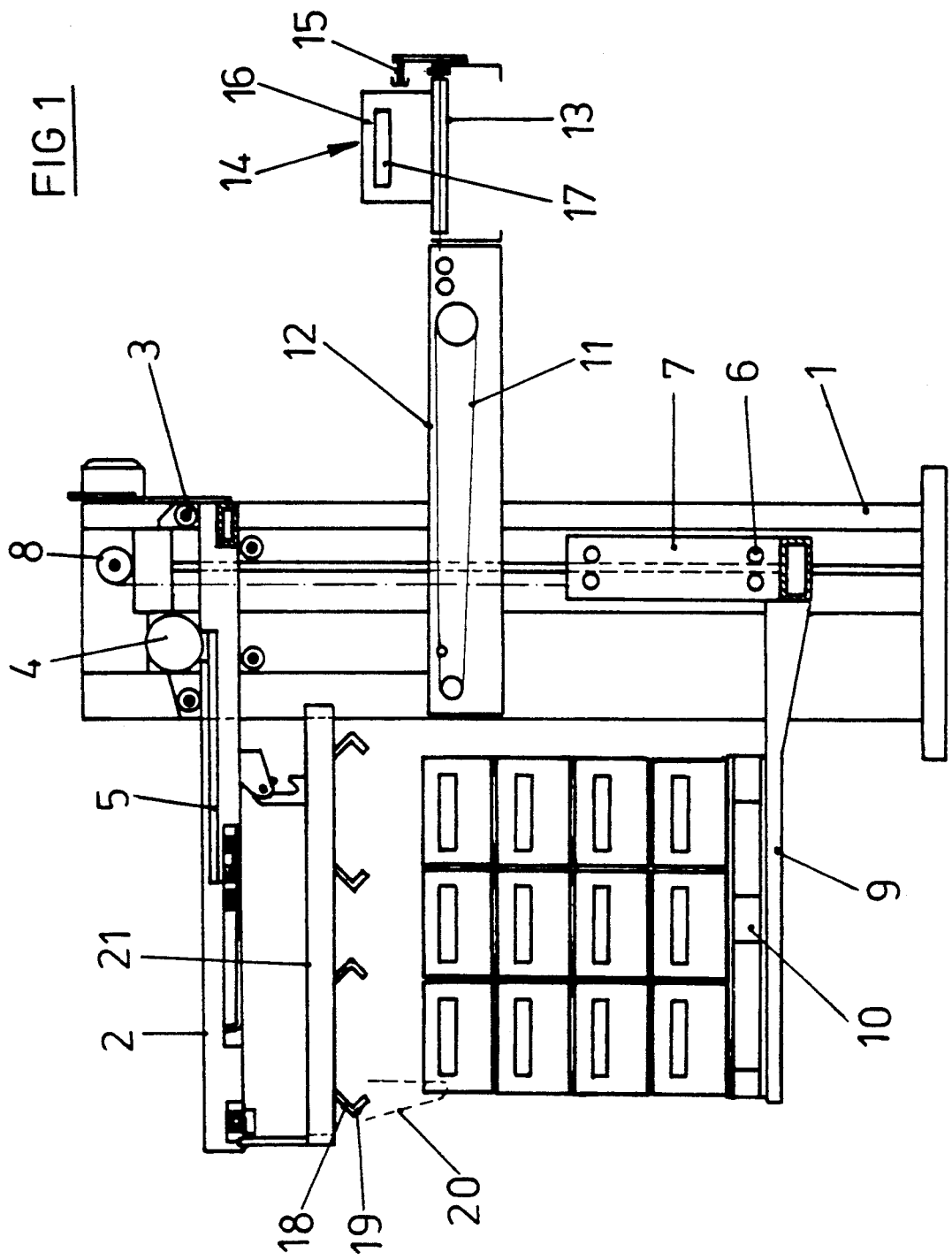
FIG. 1 is a side diagrammatic view of a palette handling device in accordance with the invention adapted for use with bottle crates.

The palette handling or palettizing device shown in FIG. 1 comprises a gantry-type stand 1, on whose horizontal transverse beam a gripper carriage 2 runs transversely in relation to it, as is indicated by casters 3. The said gripper carriage 2 is able to be reciprocated by a pushing device 5 which in the present case is a sliding device with a drive motor 4.

On the vertical columns of the stand there is a vertical moving carriage 7 provided with casters 6, which is suspended on a vertical drive mounted on the transverse beam of the stand, by which it is possible for it to be lifted against the action of gravity. The vertically moving carriage 7 is provided with a load stage 9 projecting transversely in relation to the beam of the stand, said stage 9 serving as a vertically moving platform for a palette 10.

At a higher level than the range of vertical motion of the load stage 9 there is a piling station 12, which extends from the opposite side of the same into the grantry-type stand 1, and which here is provided with a conveyor belt, said piling station adjoining a transversely running roller conveyor 13. When a palette 10 is loaded the crates 14 arriving on the roller conveyor 13 are pushed by a pushing device 15 row-wise onto the piling station 12 on which a plurality of rows are collected in a layer, which is then placed on the palette 10 by the gripper carriage 2, which straddles the piling station 12 and the load stage 9 and is able to be reciprocated. The load stage 9 is then lowered by an distance equal to the height of one crate so that the next layer may be deposited. For de-palettizing these events take place in the reverse order, that is to say the layers of the crates stacked on the palette 10 are consecutively transferred to the piling station 12 and then carried away by the roller conveyor 13.

In the illustrated working embodiment it is possible for the palette 10 to be lifted and lowered with the aid of the lifting carriage 7 and of the load stage 9 mounted thereon. The gripper carriage 2 may in this respect be stationary in height, that is to say vertically immovable. The piling station 12 and the delivery thereto are in this respect arranged in the vicinity of the upper end of the range of vertical motion of the load stage 9, but it would also be possible to arrange the load stage 9 stationarily in the vicinity of the lower end of its vertical range of motion in the illustrated working embodiment and to arrange for the gripper carriage 2 to be able to be moved vertically. For this purpose the gripper carriage 2 would have to be mounted on a vertically moving carriage running up and down the columns of the gantry-type stand 1. In the case of such a design the piling station 12 with the associated delivery means would have to be located approximately at the same level as the stationary receiving stage.

Figure 2:
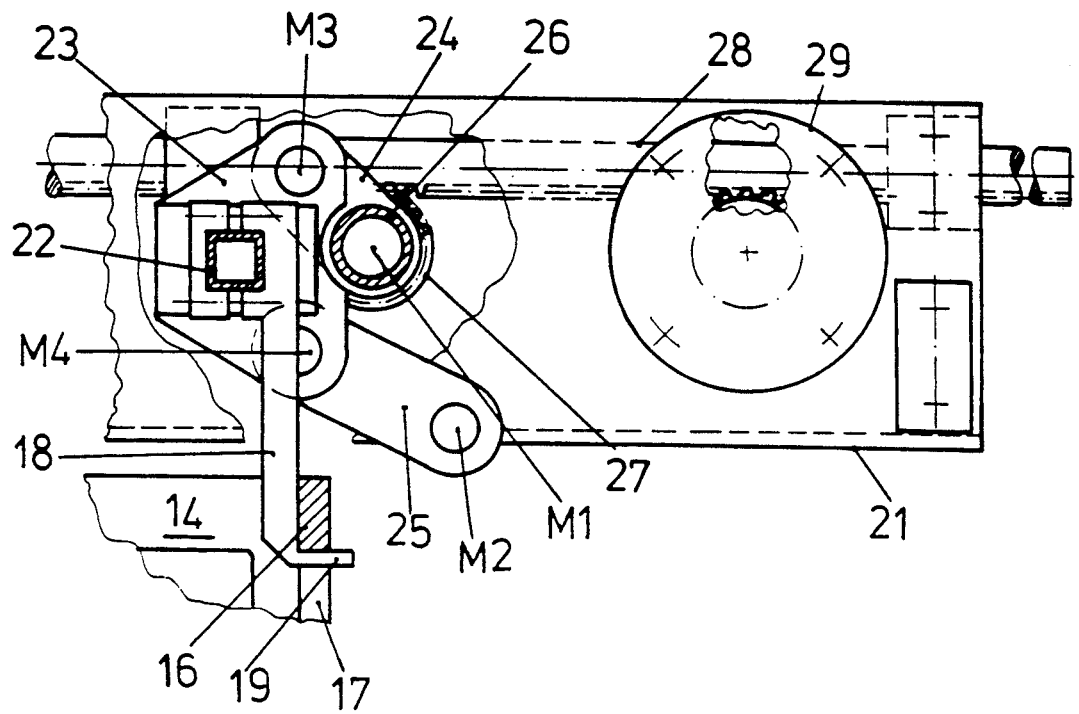
FIG. 2 is a side view of a working embodiment of the gripper drive and the gripper control means.

In their four side walls the crates 14 are provided with gripper holes 17 each having a part 16 of the wall bridging over them. In order to carry the crates 14 collected together in layers there are hook-like grippers 18 with front engaging claws 19, which are able to be fitted into and disengaged from one of the holes 17 therefor. FIG. 1 shows one operational phase, in which the grippers 18 are located in their disengaged positions. FIG. 2 shows the engaged or inserted state, in which the claw 19 of each gripper 18 is inserted into the hole 17 of a crate 14. In order to pick up and deposit a layer of crates 14 they perform a curvilinear vertical motion as indicated by an upwardly open curve 20, that is to say a curve with two limbs merging at the bottom, the grippers simultaneously performing a pivoting or slewing motion.

The grippers 18 are mounted on a gripper member 21, which for its part is interchangeably carried on the gripper carriage 2. Thus it is possible to simply replace one set of gripper heads 21 with respective grippers 18 by different ones in order to handle different types crates. In relation to this gripper member 21, which is stationary in relation to the gripper carriage 2, the grippers 18 are able to be pivoted and are arranged to be raised and lowered in accordance with the curve 20 when moved by their drive means.

Figure 3:
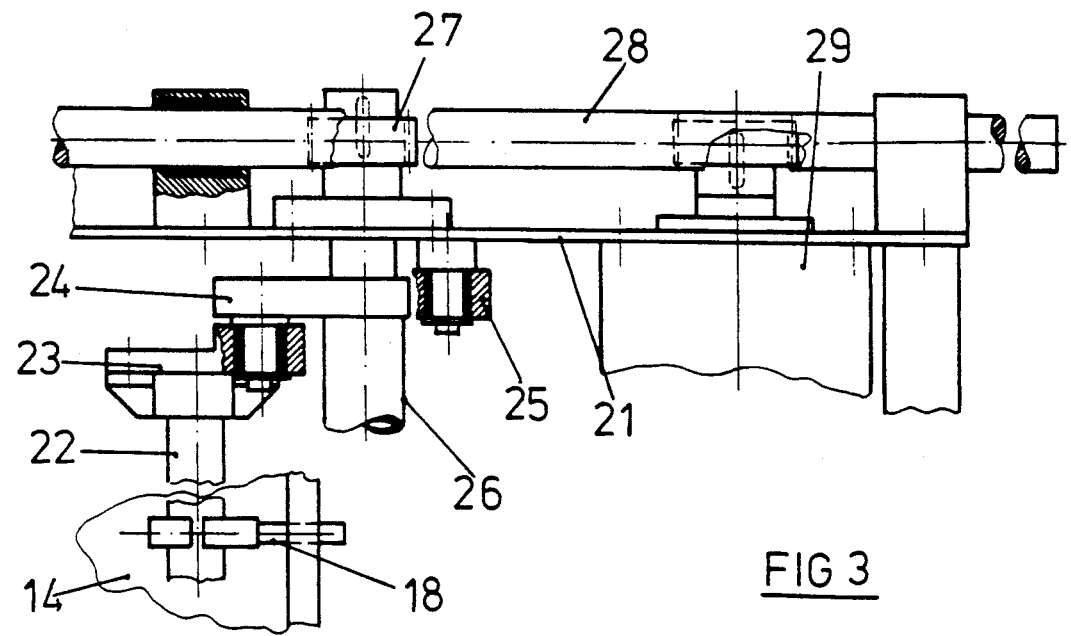
FIG. 3 is a plan view of the arrangement in accordance with FIG. 2.

For the mounting of the grippers 18 thereon the gripper member 21—as may be best seen from FIGS. 2 and 3—is provided with rods 22, which extend across its breadth and have a rectangular cross section, on which a corresponding number of grippers 18 are clamped. The rods 22 have their ends mounted in lateral bearer plates 23, on which two superposed rocking levers 24 and 25 are pivoted, which at the other ends thereof are pivoted on the frame of the gripper member 21. The stationary pivot points on the frame of the rocker levers 24 and 25 are denoted as M1 and, respectively, M2. The pivot points on the bearer plate are denoted as M3 and, respectively, M4.

Each rod 22 and the bearer plates 23 associated with it practically form a brace with angled ends, which is mounted on the gripper member 21 by means of an articulated quadrilateral linkage in the form of the rocker levers 24 and 25 and, respectively, their bearing points M1 through M4. The result is therefore a rocker lever, whose motion can be so predetermined by the length of the rocker levers 24 and 25 and the position of the bearing or pivot points MI through M4 in the desired manner so that the grippers 18 simultaneously perform a pivoting or slewing motion and a vertical motion along the curve 20 so that the crates are picked up on the fly, are lifted and are then deposited again.

One of the pivoting levers, in this case the upper pivoting lever 24, is connected with a drive device, by means of which it may be oscillated through approximately 1800 backwards and forwards. For this purpose in the illustrated working embodiment there is a shaft 26, which is bearinged at M1 in the frame of the gripper member 21 and has at least one upper pivoting lever 24 mounted on it. This shaft 26 carries a pinion 27, which is in mesh with a reciprocating rack 28. In the illustrated working embodiment the shaft 26, which extends across the full breadth of the gripper member 21, bears the two oppositely placed upper pivoting levers 24, this ensuring an exact synchronism of motion. The upper, driven pivoting levers 24 function in this case as drive links. The lower rocker levers 25, which re not driven, function as guide links.

The rack 28 driven by means Of an associated drive 29 in a reciprocating manner. For this purpose the motor of the drive device 29 is simply reversed. The rack 28 may extend along the full length of the gripper member 21 so that rocker levers arranged in a row are able to be moved thereby. In order to provide for opposite motion it is possible simply to provide an intermediate wheel. In lieu of a rack drive it would also be quite possible to drive the rocker levers using a reciprocating piston drive or the like.

The desired performance of the gripper motion is, as already mentioned, determined by the length of the rocker levers 24 and 25 and by the position of the bearing points M1 through M4. In the illustrated working embodiment the lower rocker lever 25, which functions as a guide link, is longer than the upper rocker lever 24, which functions as the drive link. The pivot point M2 of the guide link is offset in relation to the pivot point M1 on the frame by a distance equal to approximately half the length of the guide link in a distance away from the gripper 18. The pivot points M3 and M4 on the rocker levers are so placed that in the position of engagement shown in FIG. 2, they are in superposed alignment with each other. This means that the motion of the grippers 18 shown in FIG. 4 is produced.

Figure 4:
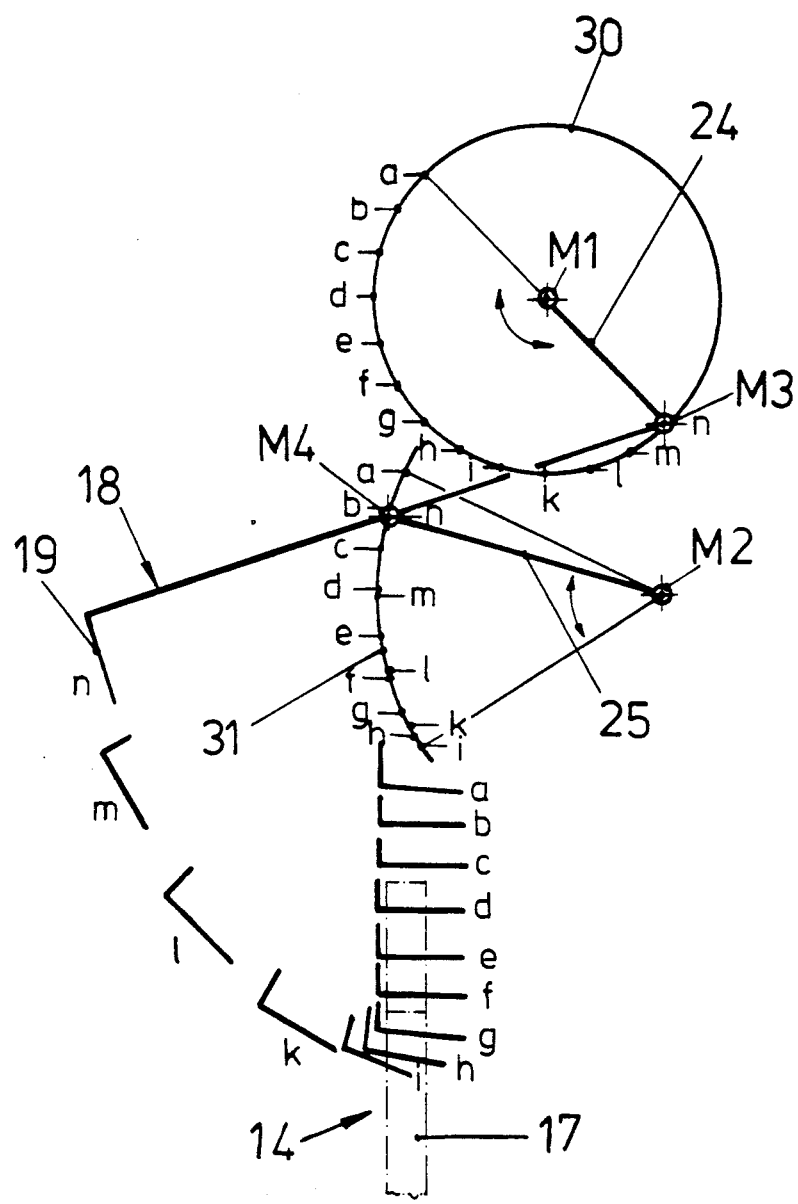
FIG. 4 is a diagrammatic chart of the motion of the grippers.

The pivot point M3 of the driven pivoting levers 24, whose pivoting motion is to amount to 180°, moves during such a pivoting stroke, as shown in FIG. 4, along a circular path 30 about the pivot point M1 on the frame. Here a plurality of positions respectively spaced by 15° from each other on the circular path 30 are indicated by the dots a through n. During the course of a stroke of the pivoting levers 24 the longer pivoting levers 25 perform a double stroke in the form of a reciprocating motion upwards and downwards, the pivot point M4 on the rocker lever moving along a circular track 31 or orbit about the pivot point M2 on the frame. The positions corresponding to the positions a through n are also indicated by the dots a through n on the circular path 31 or orbit. In the illustrated working embodiment the reversal in the direction will be seen to occur in the vicinity of the positions h through k. The claws 19 of the grippers 18 are accordingly moved for each simple stroke, that is to say in the case of each stroke in the outward direction and every return stroke of the driven pivoting levers 24 to and from along the curve 20 which was indicated in FIG. 1 and comprises two flanks joined by an arc at which reversal of direction takes place. Then simultaneously the claws 19 of the grippers 18 perform a pivoting motion out of an approximately horizontal position in the vicinity of the one flank of the curve 20 to a position with an ever increasing slope in the vicinity of the other flank of the 20. In FIG. 4 the right hand flank of the curve 20 corresponds to the approximately horizontal position of the claws 19 and the left hand flank corresponds to the inclined position of the claws 19 of the grippers 18. The positions, corresponding to the positions a through n, of the claws 19 are also indicated.

As will be seen from FIG. 4, the starting point of the motion of the grippers 18 in order to pick up a crate is the position n. In this position the grippers 18 will be at the upper end of the curved flank of the curve 20, the claws 19 being inclined obliquely downwards. Then the grippers 18 move along the curved flank of the curve 20 downwards and thus simultaneously perform a pivoting motion so that the inclination of the claws 19 becomes less and less. In the lower, arcuate reversal part of the curve 20 of motion the claws 19 then start to move, see FIG. 4, positions i through g, at a very small angle to the horizontal and enter the holes of crate 14. The grippers 18 move along the vertical flank of the curve 20 upwards with their claws 19 directed in an approximately horizontal setting, as will be seen from the positions g through a. As they move upwards the grippers 18 take the crate with them, which is reliably supported on the approximately horizontal claws 19. The first point for the deposit of a crate or of a layer of crates is accordingly the position a. Starting at this position the grippers 18 firstly move along the vertical flank of the curve 20 with the claws 19 under them while directed approximately horizontally. When the crate has been put down, the claws 19 slip out of the hole 17 while increasing their slop and then, with a further increase in slope, move upwards so that there is a reliable release of the crate. The action of engaging and lifting and, respectively, of lowering and release of the crates accordingly takes place each time during the motion of the grippers 18 along the curve 20 without there being any interruption and thus practically on the fly.

In the illustrated working embodiment the desired upwardly open curve of motion of the grippers 18 which is defined by two flanks connected by a reversal arc and of which one is vertical and the other is curved in relation to it, is produced by the articulated quadrilateral linkage shown in FIGS. 2 and 3. However it would also be possible to cause motion along such a curve in some other way, as for instance by the use of a set of slides or cams.

We claim:

1. A device for stacking and unstacking a container provided with grasping holes comprising a gripper member having grippers adapted to be brought in and out of engagement with the grasping holes so as to pick up and deposit such container, said gripper member mounted on a gripping carriage, said gripping carriage movable between a pickup site for the container and a depositing site for the container, wherein said grippers for picking up and depositing the container are arranged and adapted to be lifted and lowered to pick-up and deposit the container, said grippers pivotable in relation to said gripping member, said gripper member stationarily mounted in relation to the gripper carriage, a rocker lever connected to said grippers and to said gripper member, said rocker lever comprising:
  a first pivoting lever having one end pivotally connected to said gripper member;
  a second pivoting lever having one end pivotally connected to said gripper member and having a length that is different than the length of said first pivoting lever; and
  a bearer plate affixed to at least one of said grippers, each of said first and second pivoting levers having another end pivotally fastened to said bearer plate, one of said pivoting levers is provided with a drive means for moving said pivoting levers relative to said gripper member.

2. The device as claimed in claim 1, wherein said grippers perform a horizontal reciprocating motion modulating a curvilinear vertical motion, said grippers having claws moving along an upwardly open curve having at least one vertical flank.

3. The device as claimed in claim 2, wherein said curve along which said grippers move has an approximately vertical flank and a flank which is curved in relation to said vertical flank.

4. The device as claimed in claim 3, wherein a speed of vertical motion of the claws of the grippers decreases toward an arcuate reversal part between the two flanks of said curve.

5. The device as claimed in claim 1, wherein said rocker lever has two bearer plates pivoted on one of said pivoting levers, such bearer plates being connected with each other by means of a rod having a rectangular cross section, said grippers being clamped to said rod.

6. The device as claimed in claim 1, wherein one of said pivoting levers is connected with a pinion which is in engagement with a reversibly driven drive element.

7. The device as claimed in claim 6, wherein said drive element comprises a driven shaft extending over a breadth of the gripper member, the two pivoting levers ganged with each other.

8. The device as claimed in claim 7, wherein said driven shaft is in engagement via an intermediate gearwheel with the drive element extending along a full length of the gripper member.

9. The device as claimed in claim 1, wherein the gripper carriage is arranged so as to be stationary in a vertical direction.

10. A device for stacking and unstacking a container comprising a gripper member having grippers adapted to be brought in and out of engagement with said container so as to pick up and deposit said container, said gripper member is mounted on a gripping carriage so as to be driven on a turnover area for such container between a pickup site and a depositing site of said container, wherein said gripper are arranged and adapted to be lifted and lowered to pickup and deposit said container, said grippers pivotable in relation to said gripper member, said gripper member stationarily arranged in relation to the gripper carriage, a rocker lever connected to said grippers and to said gripper member, said rocker lever comprising two pivoting levers arranged in an articulated quadrilateral linkage between said grippers and said gripper member, one of said pivoting levers is provided with a drive means for moving said pivoting levers relative to said gripper member and one of said pivoting levers is longer than the other of said pivoting levers.

* * * * *